US008860359B2

(12) United States Patent
Cao et al.

(10) Patent No.: US 8,860,359 B2
(45) Date of Patent: Oct. 14, 2014

(54) HYBRID ENERGY STORAGE SYSTEM (75) Inventors: Jian Cao, Chicago, IL (US); Ali Emadi, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 0 days.

(21) Appl. No.: 12/576,803

(22) Filed: Oct. 9, 2009

(65) Prior Publication Data

US 2011/0084648 A1 Apr. 14, 2011

(51) Int. Cl.
*H02J 7/00* (2006.01)
*H01M 10/44* (2006.01)

(52) U.S. Cl.
CPC .............. *H01M 10/44* (2013.01); *Y02E 60/12* (2013.01); *H01M 2220/20* (2013.01); *H01M 2220/10* (2013.01)
USPC ............ 320/103; 320/104; 320/166; 320/167

(58) Field of Classification Search
USPC .................................. 320/104, 103, 166–167
See application file for complete search history.

(56) References Cited

U.S. PATENT DOCUMENTS

| | | | | |
|---|---|---|---|---|
| 5,710,699 A * | 1/1998 | King et al. | ..................... | 363/132 |
| 6,768,047 B2 * | 7/2004 | Chang et al. | ..................... | 136/244 |
| 2002/0084767 A1 * | 7/2002 | Arai | ............................. | 320/101 |
| 2003/0169022 A1 * | 9/2003 | Turner et al. | ..................... | 320/166 |
| 2007/0090808 A1 * | 4/2007 | McCabe et al. | ............... | 320/137 |
| 2008/0067974 A1 * | 3/2008 | Zhang et al. | ..................... | 320/104 |
| 2008/0218104 A1 * | 9/2008 | Lukic et al. | ..................... | 318/139 |
| 2009/0198396 A1 | 8/2009 | Rodriguez et al. | | |

OTHER PUBLICATIONS

J. Cao et al., "A New Battery/Ultra-Capacitor Hybrid Energy Storage System for Electric, Hybrid and Plug-in Hybrid Electric Vehicles," 5th IEEE Vehicle Power and Propulsion Conference (VPPC '09), Dearborn, Michigan, Sep. 7-11, 2009 (6 pages).
L. Gao et al., "Power Enhancement of an Actively Controlled Battery/Ultracapacitor Hybrid," IEEE Transactions on Power Electronics, vol. 20, No. 1, Jan. 2005 (8 pages).
A. Stienecker et al., "A Combined Ultracapacitor—Lead Acid Battery Energy Storage System for Mild Hybrid Electric Vehicles," 2005 IEEE Vehicle Power and Propulsion Conference, Chicago, IL., Sep. 2005 (6 pages).
M. Ortúzar et al., "Ultracapacitor-Based Auxiliary Energy System for an Electric Vehicle: Implementation and Evaluation," IEEE Transactions on Industrial Electronics, vol. 54, No. 4, Aug. 2007 (10 pages).
W. Lhomme et al., "Design and Control of a Supercapacitor Storage System for Traction Applications," Conference Record of the 2005 Industry Applications Conference, Oct. 2005, pp. 2013-2020.

(Continued)

*Primary Examiner* — Samuel Berhanu
(74) *Attorney, Agent, or Firm* — Pauley Petersen & Erickson (57) ABSTRACT

A hybrid energy storage system for supplying power to an application with a fluctuating load profile, such as, for example, electric vehicles, hybrid electric vehicles, plug-in hybrid electric vehicles, wind energy harvesting equipment and solar energy harvesting equipment. The hybrid energy storage system includes an ultra-capacitor electrically connected to a DC bus and a power source electrically connected to the DC bus via a controlled switch. The hybrid energy storage system further including a DC/DC converter connected between the power source and the ultra-capacitor, the DC/DC converter boosting a voltage of the power source to charge the ultra-capacitor. The DC/DC converter is preferably controlled to maintain a voltage of the ultra-capacitor at a higher value than the voltage of the power source.

12 Claims, 7 Drawing Sheets

(56) References Cited

OTHER PUBLICATIONS

D. Liu et al., "A Three-Port Three-Phase DC-DC Converter for Hybrid Low Voltage Fuel Cell and Ultracapacitor," Proc. IEEE 32nd Annual Conference on Industrial Electronics, Jun. 2003, pp. 1369-1374.

A. Di Napoli et al., "Control Strategy for Multiple Input DC-DC Power Converters Devoted to Hybrid Vehicle Propulsion Systems," Proc. 2002 IEEE Intl Symposium on Industrial Electronics, May 2002, pp. 1036-1041.

S. Lu et al., "A Unique Ultracapacitor Direct Integration Scheme in Multilevel Motor Drives for Large Vehicle Propulsion," IEEE Transactions on Vehicular Technology, vol. 56, No. 4, Jul. 2007, pp. 1506-1515.

S. Lu et al., "A New Battery/Ultracapacitor Energy Storage System Design and Its Motor Drive Integration for Hybrid Electric Vehicles," IEEE Transactions on Vehicular Technology, vol. 56, No. 4, Jul. 2007, pp. 1516-1523.

\* cited by examiner

Fig. 1

Prior Art

Fig. 2

Prior Art

Fig. 3

Prior Art

Fig. 4

Prior Art

Fig. 12

HYBRID ENERGY STORAGE SYSTEM

BACKGROUND OF THE INVENTION

1. Field of the Invention

This invention is directed to a hybrid energy storage system for supplying power to an application with a fluctuating load profile, such as, for example, electric vehicles, hybrid electric vehicles, plug-in hybrid electric vehicles, wind energy harvesting equipment and solar energy harvesting equipment.

2. Discussion of Related Art

Recently there has been an increasing interest in environmentally friendly applications such as, electric vehicles, hybrid electric vehicles, plug-in hybrid electric vehicles, wind energy harvesting equipment, and solar energy harvesting equipment. These applications typically have fluctuating load profiles that present challenges in the design of energy storage systems for the applications. Conventional approaches for powering these applications have various shortcomings.

Batteries are commonly used for energy storage in the above described applications. However, using batteries as the sole energy source has several disadvantages. For example in an electric vehicle application, in order to approach the performance of a conventional car, the battery should provide the motor with an equivalent or similar power capability as an internal combustion engine. Unfortunately, most available batteries have a relatively low power density. Although there are high power density batteries available, their price is typically much higher than low power density batteries and with the increased power density, thermal management of the battery becomes a challenge. The life of the battery is another major area of concern. In advanced automotive applications, because the load profile varies rapidly according to the road conditions and the driver's behavior, the energy storage system suffers from random charges (e.g. regenerative braking) and discharges (e.g. accelerating), which have a negative effect on the life of the battery. Balancing of a voltage of each cell in a battery system is another problem concerning the battery because, without a balancing system, individual cell voltages will drift apart over time and the voltage capacity of the total pack will decrease quickly during operation, which can result in the failure of the entire battery system. This condition is especially severe when the battery has a long string of cells or the battery is used to do frequent high rate charges and discharges.

To overcome the disadvantages of battery systems, hybrid energy storage systems have been proposed. Hybrid energy storage systems attempt to combine at least two power sources to achieve a better overall performance. The goal of such hybrid systems is generally to take advantage of characteristics of each type of power source, such as, the high energy density of batteries and the high power density and cycle life of ultra-capacitors.

Figure 1:
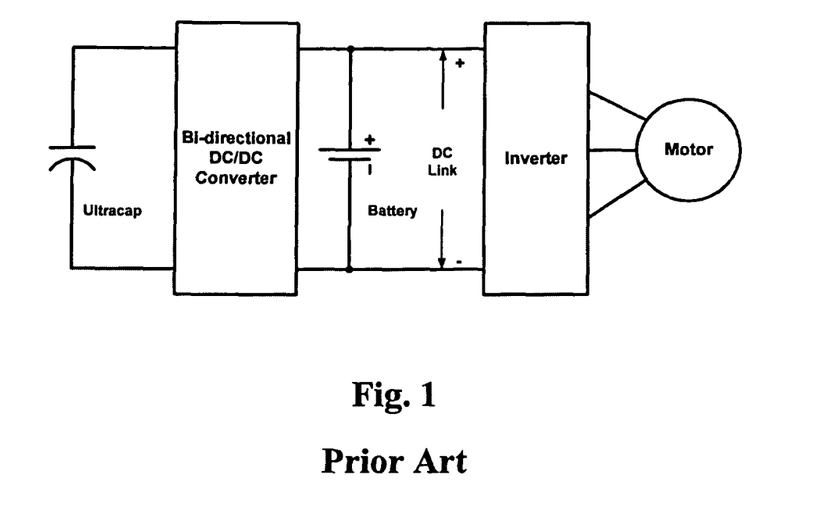
FIG. 1 is a circuit diagram of a known ultra-capacitor/battery configuration of a hybrid energy storage system.

FIG. 1 shows an example of a conventional hybrid energy storage system having an ultra-capacitor/battery configuration. In this configuration, a battery is directly connected to a DC bus and an ultra-capacitor is connected to the DC bus via a bi-directional DC/DC converter. This configuration allows the ultra-capacitor to be used over a wide voltage range and a nominal voltage of the ultra-capacitor can be lower. Connecting the battery directly to the DC bus allows a DC bus voltage to be maintained relatively constant. However, this configuration also has disadvantages. For example, the energy generated by an application, such as regenerative braking, cannot be effectively controlled to be absorbed by the ultra-capacitor and instead the generated energy is directed to the battery, thereby shortening the life of the battery. Additionally, to properly use the power of the ultra-capacitor, the bi-directional DC/DC converter should be of an equivalent size. A large bi-directional DC/DC converter can be expensive and has thermal management issues that must be addressed.

Figure 2:
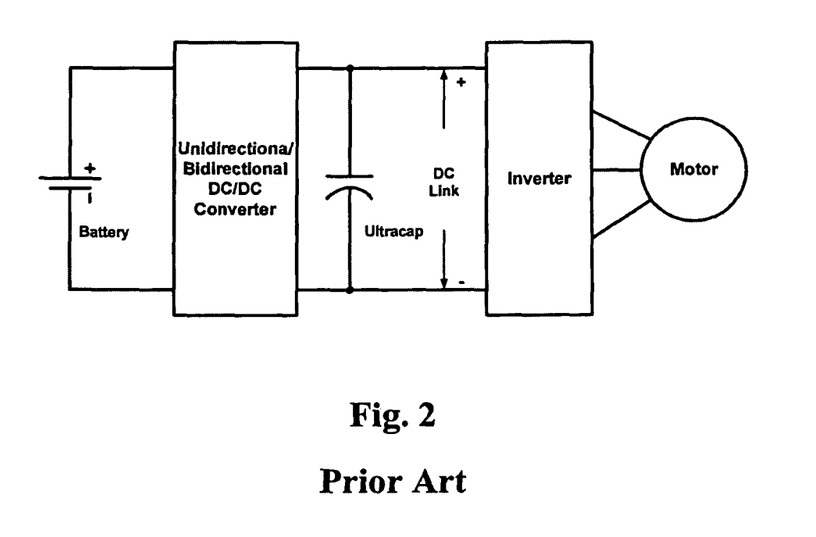
FIG. 2 is a circuit diagram of a known battery/ultra-capacitor configuration of a hybrid energy storage system.

FIG. 2 shows another conventional hybrid energy storage system having a battery/ultra-capacitor configuration. In this configuration, the ultra-capacitor is directly connected to the DC bus and the battery is connected to the DC bus via a bi-directional DC/DC converter. In this configuration, a voltage of the battery can be maintained lower and the ultra-capacitor works as a low pass filter. This configuration allows a regenerated energy from the application to be directed to the ultra-capacitor preserving the life of the battery. However, this configuration limits the working range of the ultra-capacitor.

Figure 3:
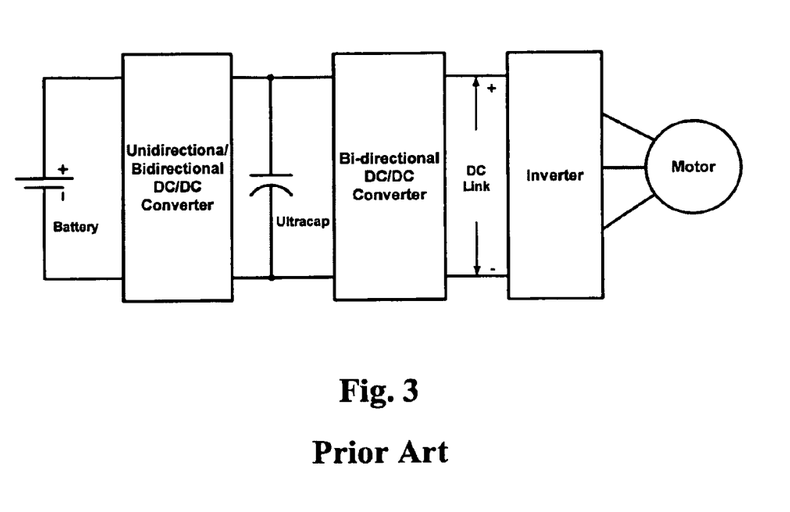
FIG. 3 is a circuit diagram of a known cascaded converter configuration of a hybrid energy storage system.

A third conventional configuration, shown in FIG. 3, includes a second bi-directional DC/DC converter between an ultra-capacitor and a DC bus. This forms a cascaded converter topology. This configuration improves the working range of the ultra-capacitor but requires the second bi-directional DC/DC converter. Disadvantages of this configuration include additional expense for a second converter and reliability issues.

Figure 4:
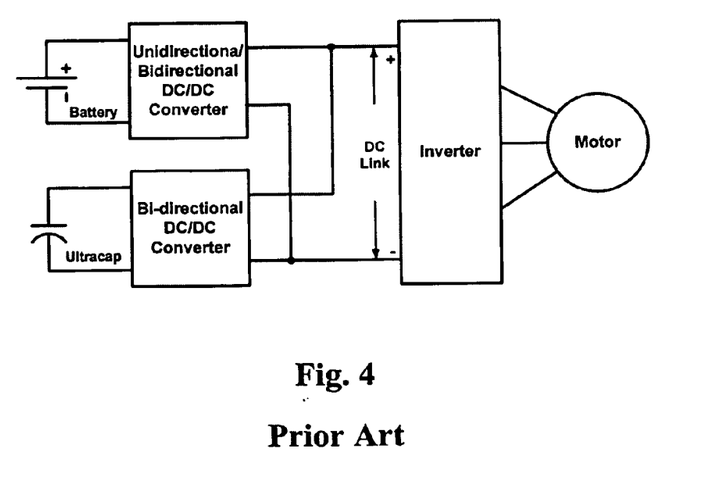
FIG. 4 is a circuit diagram of a known multiple converter configuration of a hybrid energy storage system.

FIG. 4 shows a conventional hybrid energy storage system having a multiple converter configuration. A disadvantage of this configuration is that two converters are required.

SUMMARY OF THE INVENTION

A general object of the invention is to provide a hybrid energy storage system for an application, such as, but not limited to electric vehicles, hybrid electric vehicles, plug-in hybrid electric vehicles, non-propulsion loads in vehicles, robotic applications, active power filters, wind energy harvesting equipment, and solar energy harvesting equipment. The hybrid energy storage system according to this invention includes an ultra-capacitor electrically connected to a DC bus, and also a power source electrically connected to the DC bus via a switch. The ultra-capacitor and the power source are connected via a DC/DC converter. The DC bus provides a connection to the application. The DC/DC converter is preferably controlled to maintain a voltage of the ultra-capacitor at a higher value than the voltage of the power source.

The DC/DC converter acts as a pump to boost a voltage of the power source to a higher value to charge the ultra-capacitor. By using the DC/DC converter in this manner, the size of the DC/DC converter can be smaller than previously known configurations, such as shown in the configuration of FIG. 2, where the DC/DC converter must process all of the energy from the power source.

In an embodiment of this invention, the hybrid energy storage system operates in more than two modes, and preferably in at least four modes: a low-power mode, a high-power mode, a peak-power mode and a controlled charging mode.

In the low-power mode, the DC/DC converter is able to supply a power demand of the application, and the ultra-capacitor is maintained at a higher voltage than the voltage of the power source.

In the high-power mode, the DC/DC converter is unable to supply the power demand of the application, and the voltage of the ultra-capacitor cannot be maintained. In this mode, the switch is switched on connecting the power source directly to the DC bus and to the application.

In the peak-power mode, the ultra-capacitor supplies its power to the application and the DC converter operates in a boost mode to also supply power to the application. By directly connecting the ultra-capacitor to the DC bus, the full power potential of the ultra-capacitor can be fully performed. If the peak-power mode continues long enough to drop the voltage of the ultra-capacitor to approximately an equal voltage of the power source, then the system can automatically switch to the high power mode.

In the controlled charging mode, energy generated by the application is preferably directed to charge the ultra-capacitor. In one embodiment, only when the ultra-capacitor is fully charged is the generated energy directed to the power source. The controlled charging mode can thus isolate the power source from random charges, which can desirably extend the life of the power source.

The system of this invention can also include a mode for fast charging the power source from the ultra-capacitor. The system of this invention can also include an input to charge the ultra-capacitor and/or the power source from a peripheral source, such as an electrical grid, a solar panel, a back-up battery, and/or a generator.

BRIEF DESCRIPTION OF THE DRAWINGS

These and other objects and features of this invention will be better understood from the following detailed description taken in conjunction with the drawings, wherein.

DESCRIPTION OF THE INVENTION

This invention includes a hybrid energy storage system that can be electrically connected to and used to supply power to a variety of applications including, but not limited to, electric vehicles, hybrid electric vehicles, plug-in hybrid electric vehicles, non-propulsion loads in vehicles, robotic applications, active power filters, wind energy harvesting equipment and solar energy harvesting equipment. For purposes of explanation herein, portions of the description below will be directed to the hybrid energy storage system applied to electric vehicles. This focus is not intended to limit this invention to such applications.

Figure 5:
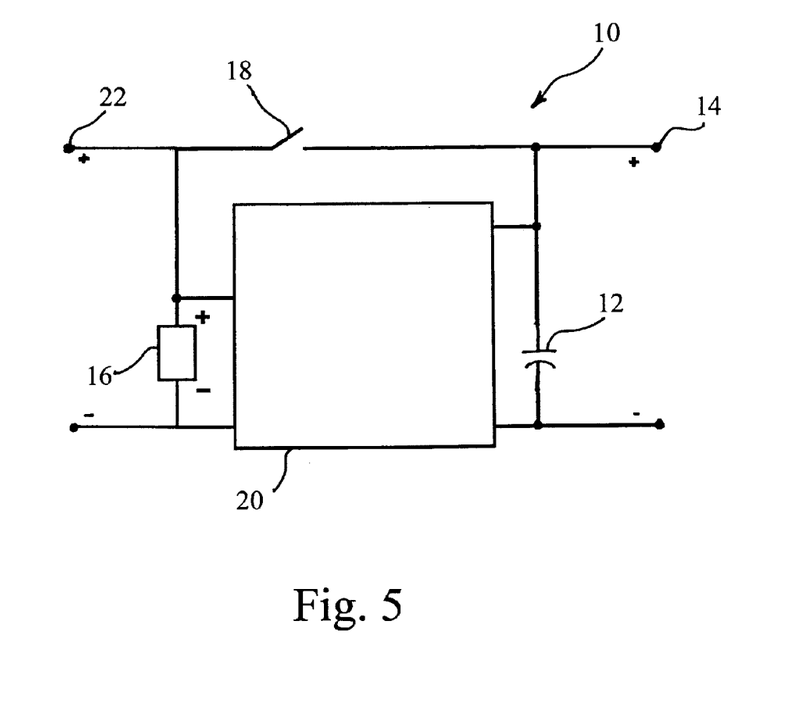
FIG. 5 is a circuit diagram of a hybrid energy storage system according to an embodiment of this invention.

FIG. 5 shows a circuit diagram of a hybrid energy storage system 10 according to one embodiment of this invention. Hybrid energy storage system 10 includes an ultra-capacitor 12 electrically connected to a DC bus 14 and a power source 16 is electrically connected to the DC bus 14 via a switch 18. The ultra-capacitor 12 and the power source 16 are connected via a DC/DC converter 20. In this embodiment, the power source 16 can be any device capable of providing power to the DC bus 14 including, but not limited to, a battery and/or a fuel cell. The switch 18 can be any device capable of connecting and disconnecting the power source 16 from the DC bus 14 including, but not limited to, a powered diode or a controlled switch. The DC/DC converter 20 can be any type of DC/DC converter including, but not limited to, a buck/boost converter, a SEPIC converter, a Split-Pi and a Ćuk converter. In a preferred embodiment, the DC/DC converter 20 is bi-directional capable of drawing power from or supplying power to the power source 16.

The hybrid energy storage system 10 is capable of operating within each of a plurality of modes. In one embodiment of the hybrid energy storage system 10 desirably operates sequentially in a plurality of modes including a low-power mode, a high-power mode, a peak-power mode, and a controlled charging mode. In the context of this description, the term "sequentially" does not require any particular pattern and/or order of operation.

Whether the hybrid energy storage system 10 operates in the low-power mode, the high-power mode or the peak-power mode at any given time period is determined based upon factors including, the power demand of an application connected to the DC bus 14, the voltage level of the ultra-capacitor 12, the voltage level of the power source, and the power capacity of the DC/DC converter 20. For example, operating an electric vehicle at a low, approximately constant speed will usually allow the hybrid energy storage system 10 to be operated in the low-power mode. Operating the electric vehicle at a high, approximately constant speed will usually require that the hybrid energy storage system 10 be operated in the high-power mode. Operating the electric vehicle to accelerate quickly will usually require that the hybrid energy storage system 10 be operated in the peak-power mode.

During the low-power mode the DC/DC converter 20 operates in a boost mode to convert the voltage of the power source 16 to a higher voltage to provide power to the application and/or to recharge the ultra-capacitor 12. If the DC/DC converter 20 is able to supply a level of power greater than or equal to the power demand of the application, the hybrid energy storage system 10 operates in the low-power mode and the switch 18 is open ("off"), thereby disconnecting the direct connection from the power source 16 to the DC bus 14. If the DC/DC converter 20 is not able to supply a level of power greater than or equal to the current power demand of the application, the hybrid electric power supply 10 operates in the high-power mode where the switch 18 is closed ("on") allowing power to be supplied directly to the application from the power source 16.

When the application requires a power demand that cannot be provided through the high-power mode, the hybrid electric storage system 10 operates in the peak-power mode. In the peak-power mode, the ultra-capacitor 12 discharges its power to the application and the DC/DC converter 20 operates in a boost mode, preferably a full power boost mode, to provide power to the application. In the peak-power mode, the voltage of the DC bus 14 is equal to the voltage of the ultra-capacitor 12. The peak-power mode can continue until the ultra-capacitor 12 is discharged to a voltage level that is approximately equal to the voltage level of the power source 16. When the ultra-capacitor 12 is discharged to the voltage level that is approximately equal to the voltage level of the power source 16, the hybrid energy storage system 10 operates in the high-power mode.

The hybrid energy storage system 10 operates in the controlled charging mode when the application provides a generated energy to the hybrid energy storage system 10. For example, operating the brakes in an electric vehicle can generate energy from the motor to the hybrid energy storage system 10 through regenerative braking. In an embodiment of this invention, the controlled charging mode further comprises a first phase and a second phase. The controlled charging mode operates in the first phase when a voltage of the ultra-capacitor is less than an ultra-capacitor voltage upper limit and in the second phase when the voltage of the ultra-capacitor is approximately equal to the ultra-capacitor voltage upper limit. The ultra-capacitor voltage upper limit is generally determined based upon the physical characteristics of the ultra-capacitor 12.

Absorbing the generated energy by repeatedly recharging the power source 16 can damage and/or shorten the life of the power source 16. Ultra-capacitors 12 can better withstand random charging. Thus the system of this invention can minimize damage to the power source 16 by directing the generated energy to the ultra-capacitor 12 when possible. When the voltage of the ultra-capacitor 12 is less than the ultra-capacitor voltage upper limit, the controlled charging mode is in the first phase. In the first phase, the hybrid energy storage system 10 is controlled to direct the generated energy to the ultra-capacitor 12. The DC converter 20 does not operate in the first phase. In order to make sure the voltage of the ultra-capacitor stays in a safe operating range, e.g. to prevent explosions, the controlled charging mode operates in the second phase when the voltage of the ultra-capacitor 12 is approximately equal to or greater than the ultra-capacitor voltage upper limit. In the second phase, the DC converter 20 operates in a buck mode to transmit the generated energy to the power source 16.

In a preferred embodiment, the DC/DC converter 20 is controlled to try and maintain the voltage level of the ultra-capacitor 12 at a voltage greater than the voltage of the power source 16 throughout the different modes of operation.

In an embodiment of this invention, the hybrid energy storage system 10 includes an input 22 to charge at least one of the ultra-capacitor 12 or the power source 16 from a peripheral source, such as, for example, an electrical grid, a solar panel, a back-up battery, a back-up fuel cell, a back-up ultra-capacitor and/or a generator. In an alternative embodiment, the hybrid energy storage system 10 can be operated to charge the power source 16 from the ultra-capacitor 12.

Figure 6:
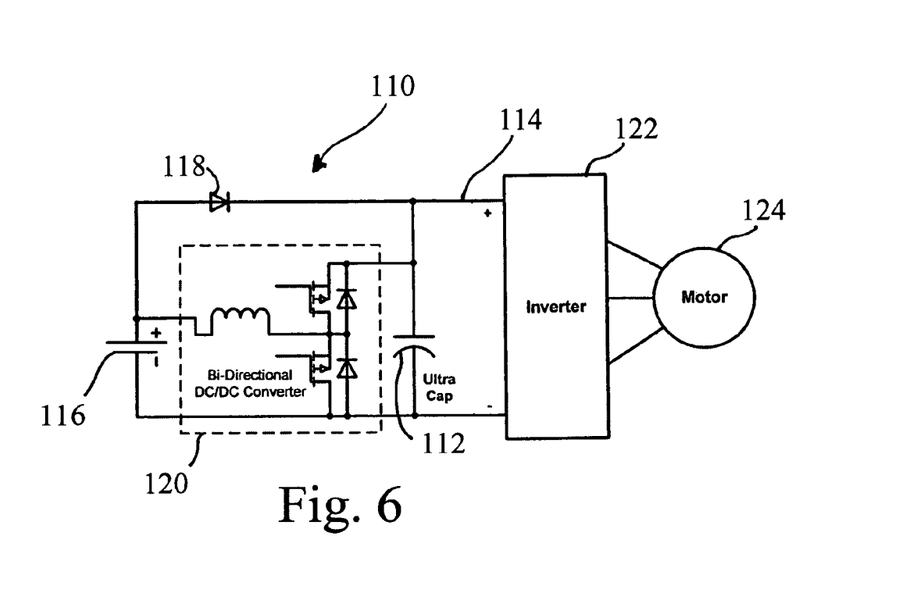
FIG. 6 is a circuit diagram of a hybrid energy storage system according to another embodiment of this invention.

FIG. 6 shows another embodiment of a hybrid energy storage system 110 according to this invention. In this embodiment, an ultra-capacitor 112 is electrically connected to a DC bus 114 and a battery 116 is electrically connected to the DC bus 114 via a switch 118. The ultra-capacitor 112 and the battery 116 are connected via a bi-directional DC/DC converter 120. Various alternative configurations are available for the ultra-capacitor 112 and the battery 116, for example, the ultra-capacitor 112 can include a plurality of ultra-capacitor cells and/or the battery 116 can include a plurality of battery cells. In this embodiment, the switch 118 comprises a powered diode. Alternatively, the switch 118 can be any device capable of connecting and disconnecting the battery 116 from the DC bus 114 including, but not limited to, a controlled switch.

In FIG. 6 the DC bus 114 is connected to an inverter 122 and a motor 124. The inverter 122 and the motor 124 represent a machine, such as, but not limited to, an electric vehicle. The inverter 122 and the motor 124 represent an application having a fluctuating load profile, which is useful in explaining the operation of the hybrid energy storage system 110. The DC bus 114 can alternately be connected to other applications including, but not limited to, a hybrid electric vehicle, a plug-in hybrid electric vehicle, a non-propulsion load in a vehicle, a robotic application, an active power filter, a wind energy harvesting equipment, and a solar energy harvesting equipment.

Figure 7:
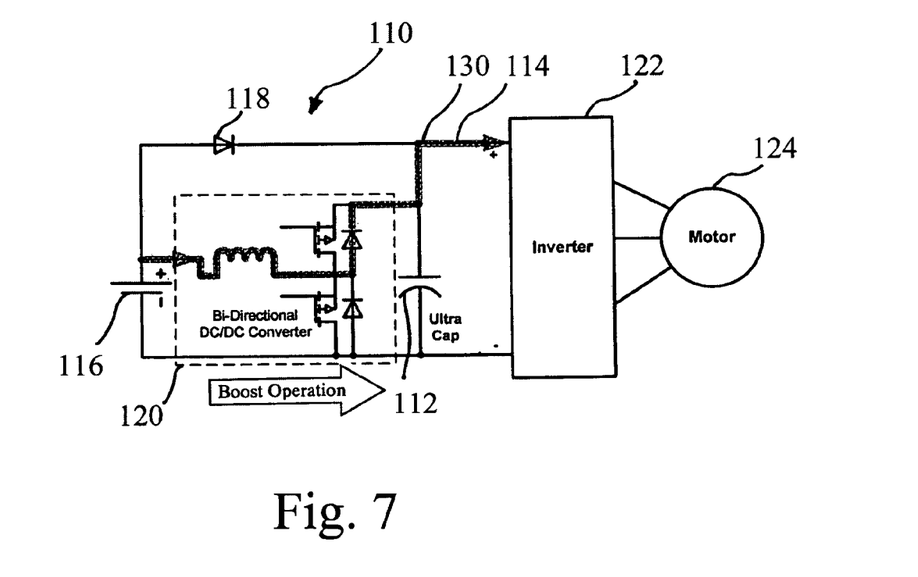
FIG. 7 is the circuit diagram of the hybrid energy storage system of FIG. 6 showing an energy flow in a low-power mode.

FIG. 7 shows an energy flow 130 of the hybrid energy storage system 110 operating in a low-power mode. In the low power mode, the bi-directional DC/DC converter 120 has enough power to provide a power demand of the motor 124 and to maintain the ultra-capacitor 112 at a voltage level higher than a voltage level of the battery 116. Since the ultra-capacitor 112 is directly connected with the DC bus 114, the DC bus 114 is also maintained at a voltage level higher than the voltage level of the battery 116. In this mode, the switch 118 is reverse biased, as a result, there is no energy flow through the switch 118.

Figure 8:
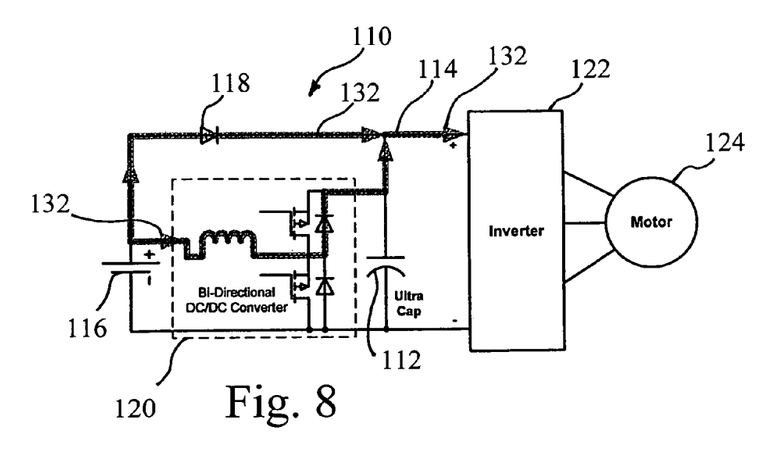
FIG. 8 is the circuit diagram of the hybrid energy storage system of FIG. 6 showing an energy flow in a high-power mode.

FIG. 8 shows an energy flow 132 of the hybrid energy storage system 110 in a high power mode. In the high power mode, the power demand of the motor 124 is higher than the power capacity of the bi-directional DC/DC converter 120. As a result, a voltage of the ultra-capacitor cannot be maintained. To provide the power demand of the motor 124, the switch 118 is forward biased allowing the battery 116 to provide power directly to the DC bus 114 through the switch 118.

Figure 9:
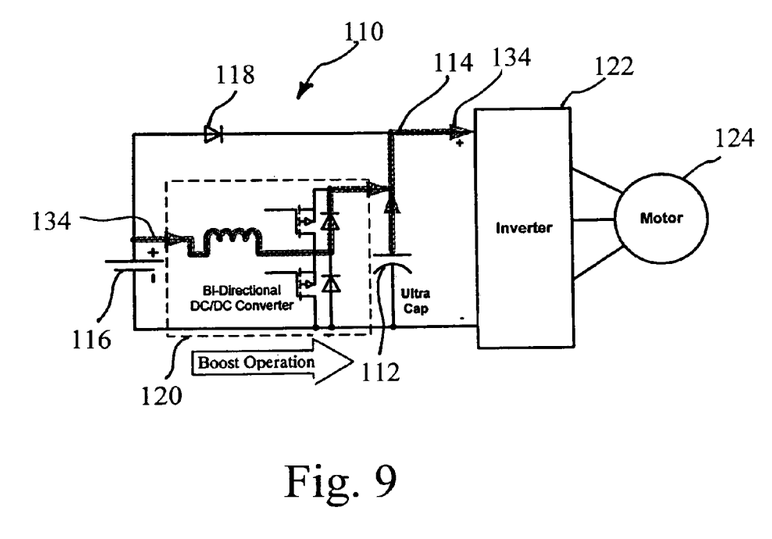
FIG. 9 is the circuit diagram of the hybrid energy storage system of FIG. 6 showing an energy flow in a peak-power mode.

FIG. 9 shows an energy flow 134 of the hybrid energy storage system 110 in a peak-power mode. In the peak-power mode, the power demand of the motor 124 is higher than the capacity of the bi-directional DC/DC converter 120 and/or the battery 116 such that the power demand must be supplied by the ultra-capacitor 112 as well as the bi-directional DC/DC converter 120 in boost operation and preferably in full power boost operation. The ultra-capacitor 112 will supply power to the motor as long as the voltage level of the ultra-capacitor 112 is greater than the voltage level of the battery 116. When the voltage level of the ultra-capacitor 112 drops to an approximately equal level to the voltage level of the battery 116, the hybrid energy storage system 110 switches to the high power mode shown in FIG. 8.

Figure 10:
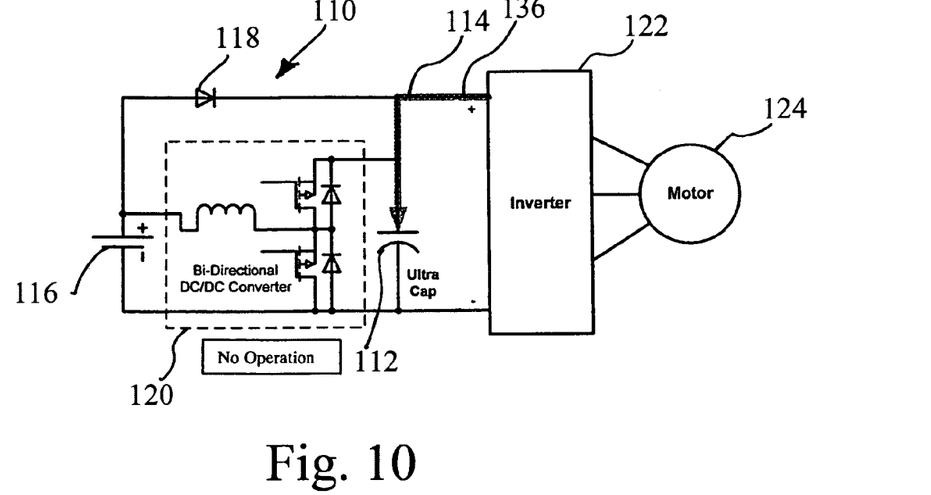
FIG. 10 is the circuit diagram of the hybrid energy storage system of FIG. 6 showing an energy flow in a controlled charging mode first phase.

FIG. 10 shows an energy flow 136 of the hybrid energy storage system 110 in a first phase of a controlled charging mode. In the first phase of the controlled charging mode a generated energy from the motor 124 is directed to the ultra-capacitor 112.

Figure 11:
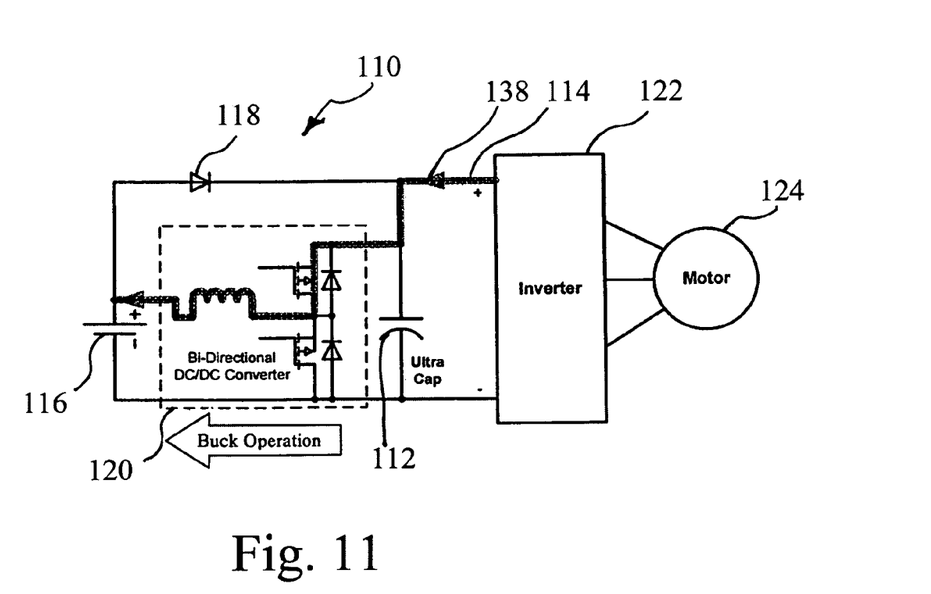
FIG. 11 is the circuit diagram of the hybrid energy storage system of FIG. 6 showing an energy flow in a controlled charging mode second phase.

FIG. 11 shows an energy flow 138 of the hybrid energy storage system 110 in a second phase of the controlled charging mode. In the second phase of the controlled charging mode the bi-directional DC/DC converter operates in a buck mode to convey a generated energy of from the motor 124 to the battery 116.

Figure 12:
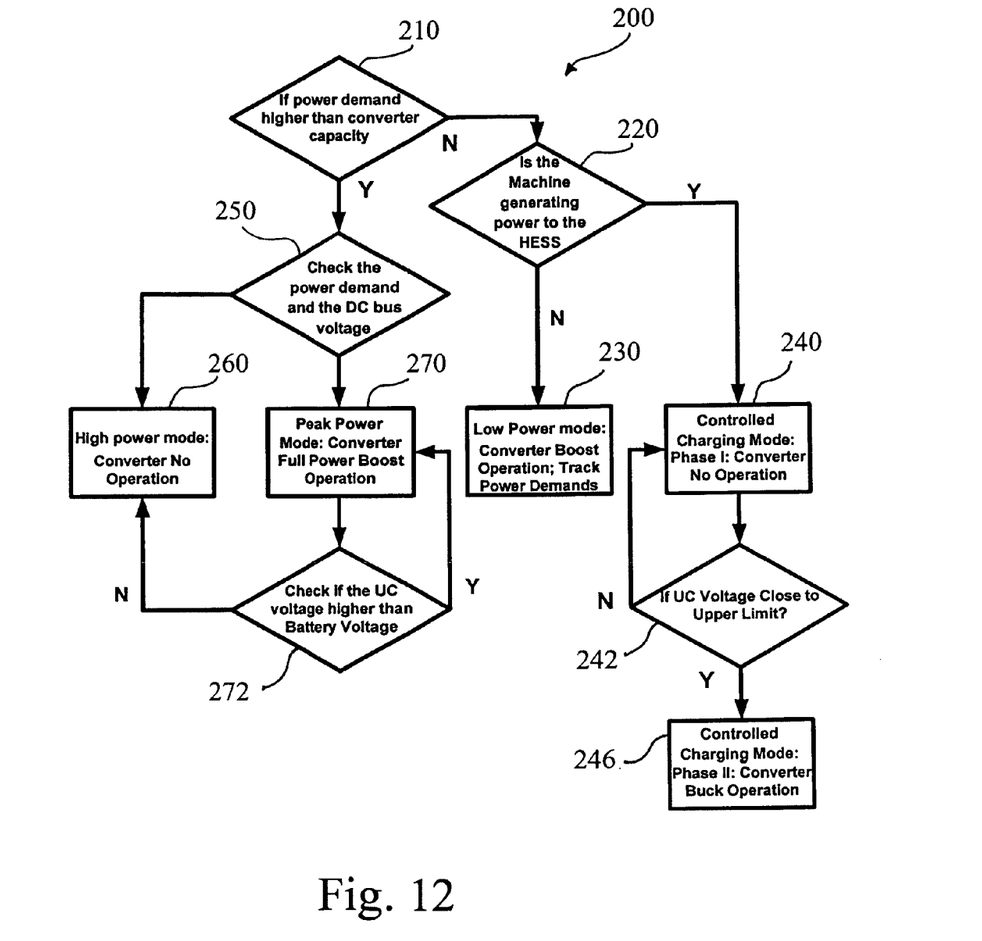
FIG. 12 is a flow chart of a method of controlling a hybrid energy storage system according to an embodiment of this invention.

FIG. 12 shows a control strategy 200 for operating the hybrid energy storage system to power a machine according to one embodiment of this invention. The control strategy is preferably implemented in one or more controllers. The one or more controllers receive a plurality of inputs from the hybrid energy storage system and the machine. These inputs provide data including, but not limited to, a power demand of the machine, a power generated by the machine, a voltage level of the ultra-capacitor, and a voltage level of the power source. The one or more controllers are also programmed with operating parameters including, but not limited to, an upper limit voltage of the ultra-capacitor. The controller implements the control strategy 200 to provide power to the machine with an alternating combination of the ultra-capacitor and the power source, for example the battery. The controller should also be able to transmit power between the ultra-capacitor, the power source and the machine via the DC bus and the bi-directional DC/DC converter.

The control strategy 200 is preferably implemented in real-time to accommodate the power requirements of the machine through various stages of operation. For example in an electric vehicle, the control strategy should be able to handle changes in operation when an operator accelerates the electric vehicle (the peak-power mode) and then changes to braking (controlled charging mode).

The control strategy 200 begins in diamond 210, the controller determines a power demand of the machine and compares this power demand with a power capacity of the bidirectional DC/DC converter. If the power demand is less than or equal to the capacity of the bi-directional DC/DC converter, the control strategy 200 proceeds to diamond 220. If the power demand is greater than the capacity of the bi-directional DC/DC converter 120, the control strategy 200 proceeds to diamond 250.

In diamond 220, the control strategy 200 determines if the machine is generating power, for example through regenerative braking. If the machine is not generating power, the hybrid electric storage system operates in the low-power mode, box 230. In the low-power mode the bi-directional DC/DC converter operates in a boost mode to supply power to the DC bus and/or to charge the ultra-capacitor. Conversely, if the machine is generating power to the hybrid electric storage system, the hybrid electric storage system operates in the controlled charging mode, box 240. In the controlled charging mode, the voltage level of the ultra-capacitor is measured, diamond 242. If the voltage level of the ultra-capacitor is less than the ultra-capacitor upper limit, the hybrid electric storage system 110 operates in the controlled charging mode first phase, box 240, sending the generated energy to the ultra-capacitor. If the voltage level of the ultra-capacitor is greater than or equal to the ultra-capacitor upper limit, the hybrid electric storage system operates in the controlled charging mode second phase, box 246, the DC/DC converter operates in a buck mode to send the generated energy to the power source.

In diamond 250, the hybrid electric storage system checks the power demand of the machine and the voltage of the DC bus. If the power demand is greater than the power capacity of the bidirectional DC/DC converter and the voltage of the DC bus is less than the voltage of the ultra-capacitor, then the hybrid electric storage system operates in the high-power mode, box 260.

If the power demand is greater than the power capacity of the bidirectional DC/DC converter and the voltage of the DC bus is equal to the voltage of the ultra-capacitor, then the hybrid electric storage system operates in the peak-power mode, box 270. The hybrid electric storage system 110 can operate in the peak-power mode, as needed, as long as the voltage of the ultra-capacitor is greater than the voltage of the battery. When the voltage of the ultra-capacitor is approximately equal to the voltage of the power source, the method switches the mode of operation to the high-power mode.

Thus, the invention provides a hybrid energy storage system for an application with a fluctuating load profile. It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A hybrid energy storage system for powering an application comprising:
    an application connector for connecting to the application;
    an ultra-capacitor directly electrically connected to the application connector;
    a power source electrically connected to the application connector through a first path and a second path, wherein the first path passes through a bi-directional DC/DC converter and the second path passes through a switch and does not include the bi-directional DC/DC converter of the first path;
    wherein the hybrid energy storage system operates in a plurality of modes of operation including a low-power mode, a high-power mode;
    wherein during the low-power mode the bi-directional DC/DC converter is able to supply a power demand of application, the switch of the second path is off and the power source provides power to the application through the bi-directional DC/DC converter of the first path; and
    wherein during the high-power mode the bi-directional DC/DC converter is unable to supply the power demand of application, the switch of the second path is on allowing the power source to provide power to the application through the second path and the power source provides power to the application through the bi-directional DC/DC converter of the first path.

2. The hybrid energy storage system of claim 1, wherein the application comprises one of an electric vehicle, a hybrid electric vehicle, a plug-in hybrid electric vehicle, a non-propulsion load, a robotic application, an active power filter, a wind energy harvesting equipment, and a solar energy harvesting equipment.

3. The hybrid energy storage system of claim 1, wherein the hybrid energy storage system further operates in a controlled charging mode and a peak-power mode.

4. The hybrid energy storage system of claim 1, further comprising a motor in electrical connection with the application connector bus.

5. The hybrid energy storage system of claim 1, wherein the power source comprises a battery or a fuel cell.

6. The hybrid energy storage system of claim 1, wherein the switch comprises a powered diode.

7. The hybrid energy storage system of claim 1, wherein the bi-directional DC/DC converter is controlled to maintain the ultra-capacitor at a voltage greater than a voltage of the power source.

8. The hybrid energy storage system of claim 1, further comprising an input to charge at least one of the ultra-capacitor or the power source from a peripheral source.

9. The hybrid energy storage system of claim 8, wherein the peripheral source comprises a solar panel, a back-up battery or a generator.

10. The hybrid energy storage system of claim 3, wherein during the peak-power mode the application connector is at a voltage equal to a voltage of the ultra-capacitor and the bi-directional DC/DC converter operates in a boost mode.

11. The hybrid energy storage system of claim 3, wherein the controlled charging mode comprises a first phase and a second phase, wherein during the first phase a generated energy is conveyed to the ultra-capacitor and during the second phase the bi-directional DC/DC converter operates in a buck mode to convey the generated energy to the power source.

12. The hybrid energy storage system of claim 11, wherein the ultra-capacitor further comprises an ultra-capacitor voltage upper limit, during the controlled charging mode the hybrid energy storage system operates in the first phase when the ultra-capacitor is at a voltage that is less than the ultra-capacitor voltage upper limit, and the hybrid energy storage system operates in the second phase when the ultra-capacitor is at a voltage that is approximately equal to the ultra-capacitor voltage upper limit.

* * * * *